Dec. 12, 1967  J. O. KOENIG  3,357,578
BOAT CARRIER FOR PICKUP MOUNTED CAMPER COACHES
Filed Feb. 7, 1966  2 Sheets-Sheet 1
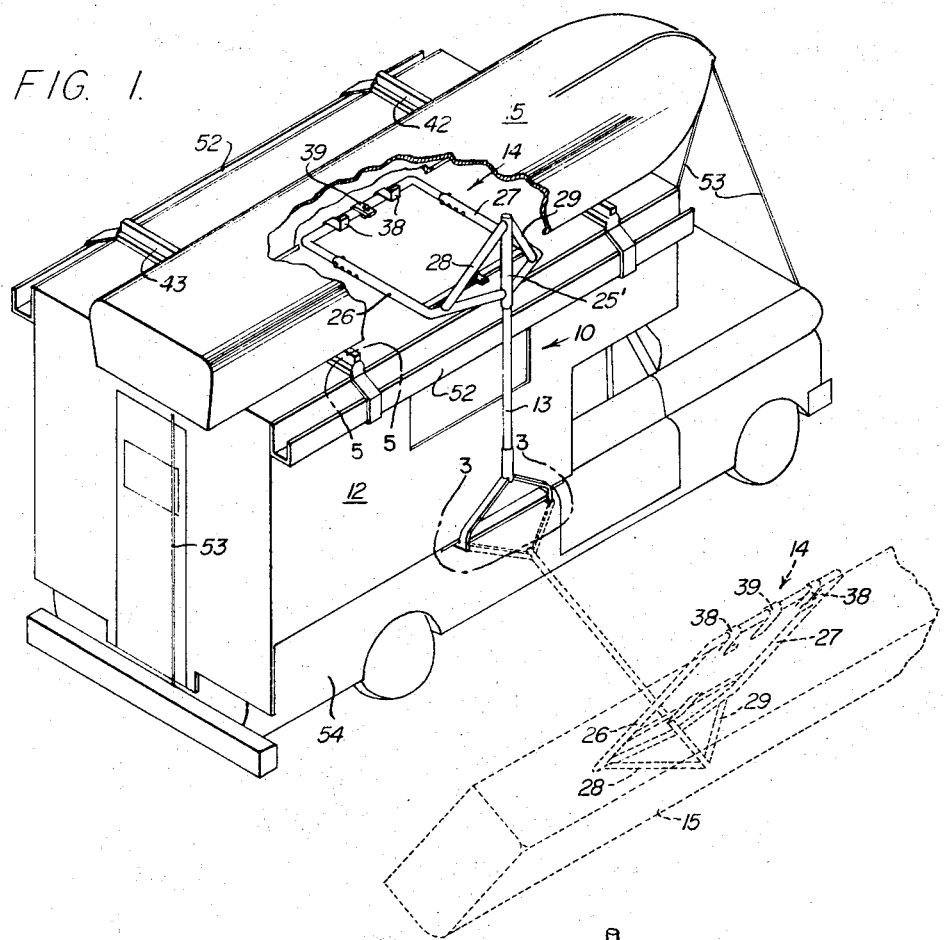
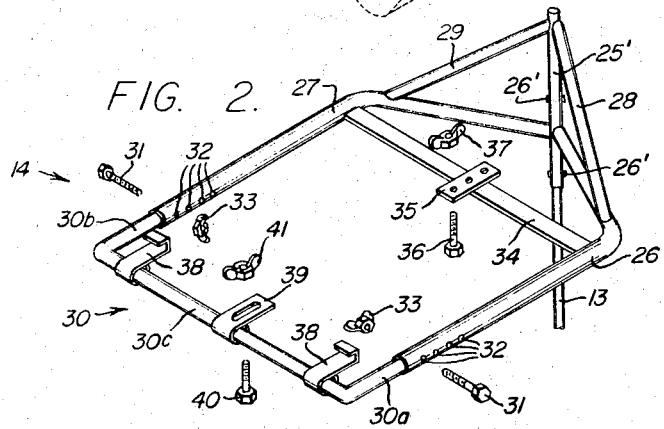
INVENTOR.
JOHN O. KOENIG
BY  MALLINCKRODT &
MALLINCKRODT
ATTORNEYS Dec. 12, 1967   J. O. KOENIG   3,357,578
BOAT CARRIER FOR PICKUP MOUNTED CAMPER COACHES
Filed Feb. 7, 1966   2 Sheets-Sheet 2
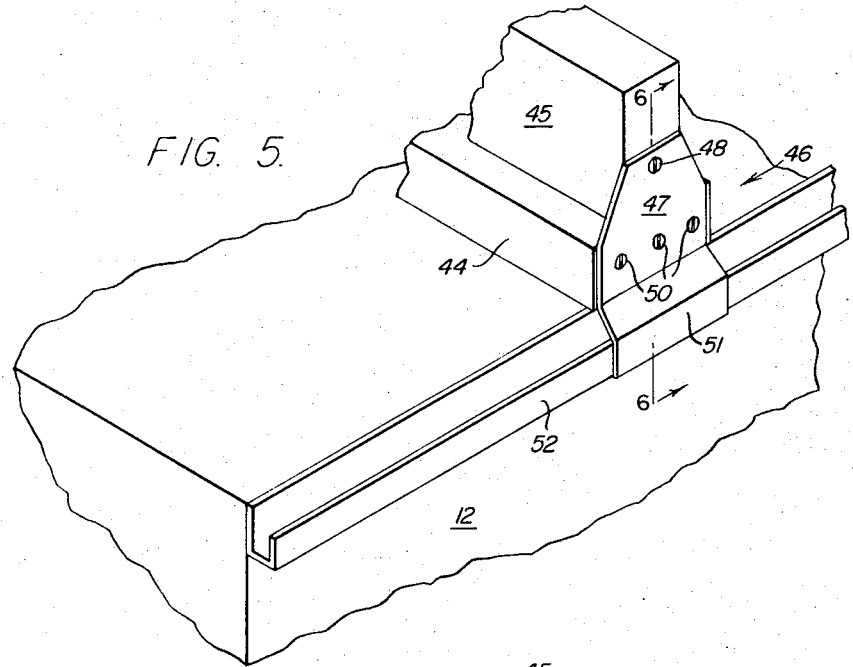
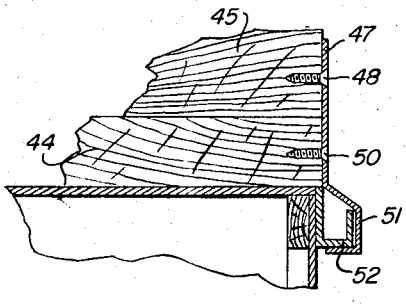
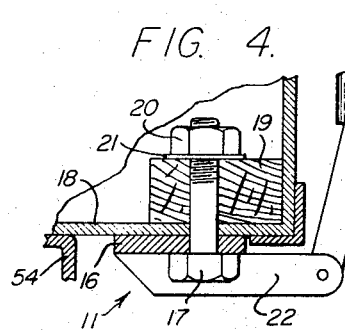
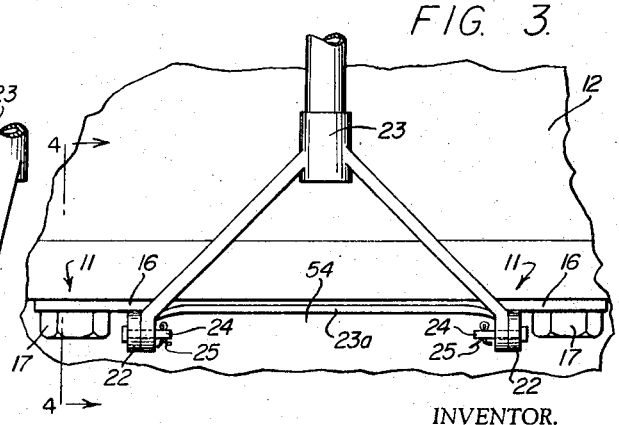
INVENTOR.
JOHN O. KOENIG
BY MALLINCKRODT & MALLINCKRODT
ATTORNEYS

United States Patent Office 3,357,578
Patented Dec. 12, 1967

3,357,578
BOAT CARRIER FOR PICKUP MOUNTED
CAMPER COACHES
John O. Koenig, 1841 S. Oakmont Drive,
Bountiful, Utah 84010
Filed Feb. 7, 1966, Ser. No. 525,436
5 Claims. (Cl. 214—450)

ABSTRACT OF THE DISCLOSURE

A boat carrier for pickup mounted camper coaches comprising brackets for mounting beneath an overhanging side edge of the camper, a support arm pivotally connected at one end to the brackets and an adjustable support frame cantilever mounted on the other end of the support arm, the support frame being adapted to transversely span the boat to be carried from one side thereof and to be secured to the boat.

---

This invention relates to devices used to move boats onto and off the top of a camper coach that is itself mounted on a pickup truck.

In the past, various devices have been developed for use in lifting boats onto the top of automobiles and for lowering them back to the ground. Some of these are shown for example in U.S. Patents Nos. 2,486,316, 2,561,199, and 2,584,163. So far as I am aware, however, there has not heretofore been a lifting device especially adapted to use with camper coaches that are adapted to be mounted on a pickup truck.

It is an object of the present invention to provide an inexpensive carrier for use in lifting boats onto the top of a camper coach when it is mounted on a pickup truck, and for use in easily lowering the boat back to the ground.

Because such pickup-camper coach combinations normally take advantage of all available length for occupancy space, a further object is to provide such a carrier that will not extend the overall length of the combination, thereby increasing maneuvering difficulties, especially in traffic congested areas. It is also an object to provide a carrier that can be removed with the camper coach when it is removed from the pick-up truck, for storage or other purposes.

Principal features of the invention include a tubular support frame that is adjustable to fit various boat or canoe gunwales and that is quickly and easily connected to a boat to be lifted; and a single support arm for the frame that is adapted to be fixed beneath an overhanging side portion of the camper coach, thereby minimizing the obstruction of the view of a driver and avoiding the use of any solid support structure positioned dangerously at the front end of the truck.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

In the drawings:

FIG. 1 is a view in perspective of the carrier of the invention, shown after it has been used to move a boat onto a camper coach that is mounted on a pick-up truck, and with the lowered loading position of the carrier and the boat shown in phantom;

FIG. 2, an enlarged, exploded, perspective view of the support frame portion of the carrier, rotated 90° counterclockwise from the showing in FIG. 1, to more clearly show the component parts;

FIG. 3, an enlarged, fragmentary side elevation view taken within the line 3—3 of FIG. 1 and showing the support structure for the load frame mounted on a camper coach that is also shown fragmentarily;

FIG. 4, a vertical section, taken on the line 4—4 of FIG. 3;

FIG. 5, an enlarged, fragmentary perspective view, taken within the line 5—5 of FIG. 1, showing the roof top rest construction and mounting; and FIG. 6, a fragmentary vertical section, taken on the line 6—6 of FIG. 5.

Detailed description

Referring now to the drawings:

The boat carrier of the invention, shown generally at 10 in FIG. 1, has a pair of mounting brackets 11 fixed to the underside of an overhanging edge of a camper coach 12 and a support arm 13 that is pivotally connected to the mounting brackets such that it, together with a support frame 14 carried thereby and a boat 15 affixed to the support frame can be pivoted betwen the solid and phantom positions illustrated in FIG. 1.

Mounting brackets 11 are best seen in FIGS. 3 and 4. Each bracket includes a plate 16 adapted to be bolted with bolts 17 to the camper coach. Bolts 17 are passed through their respective plate 16, the aluminum exterior skin 18 of the camper coach and an interior frame member 19. A nut 20, threaded onto each bolt 17 acts against a flat washer 21 that bears against frame member 19 to firmly hold the associated mounting bracket in place. An arm 22 extends from each plate 16, out from beneath the side of the camper coach to provide attachment means for a bifurcated bracket 23 on the end of support arm 13.

One leg of the bifurcated bracket 23 is pivotally connected to each of the arms 22 by a pin 24 that passes through both the arm and the leg and is held in place by a cotter key 25 passed through its end. A reinforcement brace 23a is desirably provided between the legs of the bracket.

Support frame 14 is mounted on the end of support arm 13 opposite bifurcated bracket 23 and includes a tubular section 25' that is telescoped over the end of arm 13 and that is fixed thereto by rivets 26' that pass through both section 25 and arm 13. Obviously, bolts, welding, or other securement means could be used in place of the rivets 26' to hold the support frame on support arm 13. Bent tubes 26 and 27 that converge to a connection with tubular section 25, intermediate its length and that are substantially parallel throughout the greater portions of their lengths are supported by a pair of braces 28 and 29 that respectively interconnect the tubes 26 and 27 with the end of section 25'. A U-shaped tube 30 is dimensioned such that its legs 30a and 30b telescope inside tubes 26 and 27 respectively, and form with them a broad loading platform.

A bolt 31 is adapted to be inserted through one of a plurality of holes 32 through each of the tubes 26 and 27 and through a corresponding hole in each of the legs 30a and 30b. A nut 33 is adapted to be threaded onto each bolt 31, to hold it in place. By removing the bolts 31 and telescoping legs 30a and 30b into or out of tubular sections 26 and 27 and then replacing the bolts 31 through holes 32, aligned with the holes in legs 30a and 30b, the overall size of the platform can be changed to accommodate boats and canoes of widely varying gunwale dimensions.

A rod 34 is fixed between the parallel portions of tubes 26 and 27 to serve as a brace and to carry a plate 35 to which one side edge of the boat to be carried is fastened by a bolt 36 and nut 37. For this purpose, the flange commonly formed at the top edge of presently popular lightweight boats and canoes must have a hole drilled therethrough.

In use, the support arm 13 is pivoted to its lowered position and the boat is moved adjacent to the support frame and is tipped up on its side. The boat is then slightly lifted from one end to hook the flange formed at one side of its top edge onto hooks 38 carried by the connecting portion 30c of tube 30. The boat is then allowed to swing against the platform, bolt 36 is inserted through matching holes in the plate 35 and the flange on the other side of the top edge of the boat and nut 37 is threaded onto the bolt to secure the boat on the carrier.

Since the hole through the top edge of the boat is drilled at the balance point of the boat it is a simple matter to position the boat on the carrier so that only a minimum effort is required to lift it onto the camper coach.

In addition, another plate 39 is carried by the connecting portion 30c of tube 30 and another bolt 40 and nut 41 combination are used to secure the top flange of the boat to the load platform. The bolt 40 is inserted through a hole provided in the top flange and prevents the boat slipping off the hooks.

After the boat has been loaded it is manually lifted above the camper coach by pivoting support arm 13 about pins 24.

Spaced load distribution members 42 and 43 are positioned to extend completely across the top of the camper so that they can receive the boat and distribute its weight to the load bearing interior framework of the camper coach.

Each load distribution member includes an elongate, relatively flat base member 44, adapted to rest on the top of the camper coach, an upright member 45 having the same length as the base 44 and extending upwardly from the base such that when the boat is rested thereon, the platform portion of the carrier that is attached to the boat is held off the roof of the camper coach.

A clamp 46 is positioned at each end of each distribution member to hold the base and upright members together and to position the distribution members on the roof of the camper coach. Thus, each clamp includes an upright portion having holes through which screws 48 are passed into the associated upright member 45 and other holes through which screws 50 are passed into the associated base member. An angulated portion 51 is also provided that will just fit over the rain gutter 52 at the top edge of the coach.

After the boat has been positioned on the coach ropes 53 at the front and rear of the boat can be used to tie it securely to the bumpers of the truck 54 on which the coach is mounted.

While the underhung mounting or brackets 11 is preferred from an appearance standpoint, the plates 16 can be bolted to the side of the coach in the event there is insufficient overhang of the coach and the assembly can still be used in the manner described.

Whereas there is here illustrated and specifically described a certain preferred construction of apparatus which is presently regarded as the best mode of carrying out the invention, it should be understood that various changes can be made and other constructions adopted without departing from the inventive subject matter particularly pointed out and claimed herebelow.

I claim:
1. A boat carrier for pickup mounted camper coaches comprising
   mounting brackets adapted to be fixed beneath the overhanging side of a camper coach and including arms extending from beneath the camper;
   a support arm pivotally connected at one end to the arms of said mounting brackets, whereby said arm is pivotable between an upright position alongside the coach and a lowered position extending outwardly from the side of the coach;
   a support frame on the other end of the support arm, said support frame including an adjustable, broad, load carrying, platform extending substantially normal to said support arm, the said platform comprising a pair of bent tubular members fixed to the support arm and each having a straight portion, said straight portions being substantially parallel, a U-shaped tubular member, the legs of which are each adapted to telescope with respect to a straight portion of one of said bent tubular members, and means for fixing the relative telescoped positions of the bent tubular members and the U-shaped tubular member; and
   means carried by the platform for holding a boat securely thereon.
2. In combination
   a truck;
   a camper coach carried by said truck;
   mounting brackets on the side of the camper;
   a support arm pivotally connected at one end to the mounting brackets, whereby said arm is pivotable between an upright position alongside the coach and a lowered position extending outwardly from the side of the coach and the truck;
   a support frame on the other end of the support arm, said support frame including an adjustable, broad, load carrying platform cantilevered out from the support arm, and braces interconnecting the platform and the arm; and
   means carried by the platform for securely fastening a boat thereto such that the support frame extends transversely across the top of the boat.
3. A boat carrier according to claim 1, wherein the means for fixing the relative positions of the bent tubular members and the U-shaped tubular member comprises
   a row of spaced holes through the straight portions of of the bent tubular members;
   a hole through each leg of the U-shaped member, adapted to be aligned with the row of holes through the straight portions;
   bolts adapted to be inserted through said aligned holes; and
   a nut for each of said bolts.
4. A boat carrier according to claim 3, wherein the means carried by the platform for holding a boat securely thereon comprises
   a plurality of hooks carried by the U-shaped member and adapted to engage the flange on the top edge of a boat;
   a rod interconnecting the bent tubular members;
   a plate having a hole therethrough, carried by the rod;
   a bolt adapted to be inserted through the hole in the plate and through a corresponding hole in the flange surrounding the top edge of the boat; and
   a nut adapted to be threaded onto said bolt.
5. A boat carrier according to claim 4, wherein the platform for holding a boat securely thereon further includes plate having a hole therethrough, carried by the U-shaped member;
   a bolt adapted to be inserted through the hole in the plate carried by the U-shaped member and through a corresponding hole in the flange surrounding the bottom edge of the boat; and
   a nut adapted to be threaded onto said last named bolt.

References Cited

UNITED STATES PATENTS 2,584,163   2/1954   Squires _____ 214—450

HUGO O. SCHULZ, *Primary Examiner.*